March 16, 1937. H. GOEDDERTZ 2,074,176
AUTOMOBILE TRUNK
Filed Oct. 29, 1934
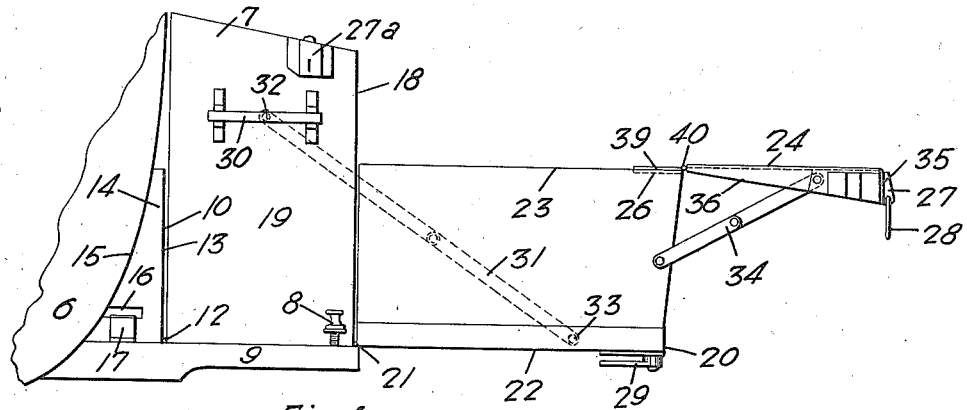
Fig. 1
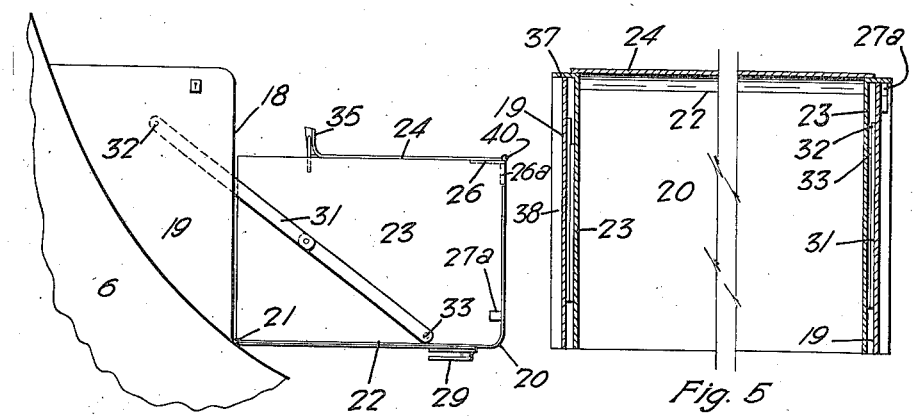
Fig. 2
Fig. 5
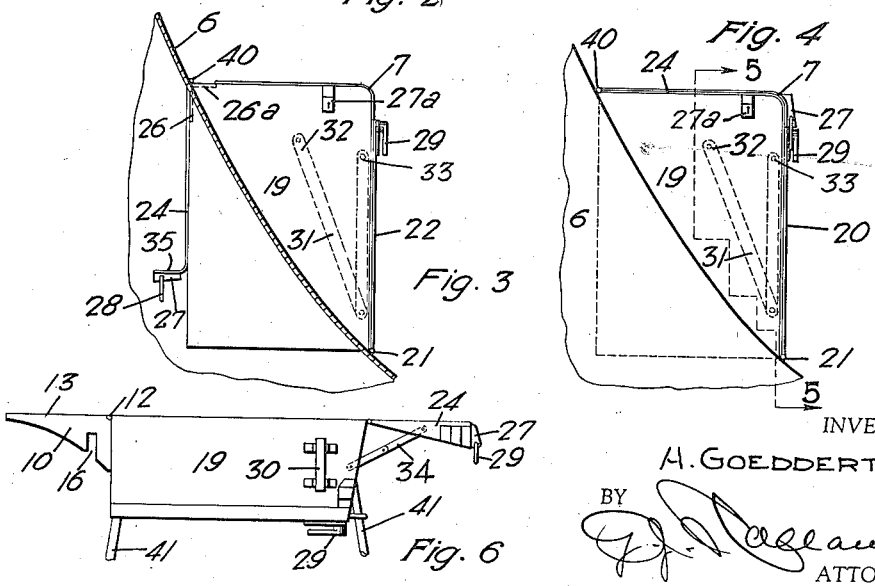
Fig. 3
Fig. 4
Fig. 6
INVENTOR.
H. GOEDDERTZ.
BY
ATTORNEY.

Patented Mar. 16, 1937

2,074,176

UNITED STATES PATENT OFFICE 2,074,176

AUTOMOBILE TRUNK

Henry Goeddertz, Denver, Colo.

Application October 29, 1934, Serial No. 750,475

7 Claims. (Cl. 296—37)

My invention relates to a trunk for attachment to a vehicle, and more particularly to improvements in a trunk of the character shown and described in Patent No. 1,803,901 granted to me on May 5, 1931.

The present application constitutes a continuation-in-part of my co-pending application, Serial No. 506,697, filed January 5, 1931 on Automobile trunk, and contains subject matter disclosed but not claimed in said co-pending application.

It is an object of the present invention to provide a table by opening the trunk, with the table top maintained at a sufficient distance above ground to afford maximum comfort to users seated at the table.

Another object of the invention is the provision of a trunk which may be readily attached to the modern "turtle-back" style of automobile body construction.

Still another object is the provision of a trunk whose top cover is movable to an out-of-the-way position while permitting access to the interior of the trunk body from above.

Other objects reside in details of construction and novel combinations and arrangements of parts as will more fully appear in the course of the following description.

In the drawing like reference numerals indicate corresponding parts in the several views.

Figure 1 represents a side elevation of the invention, attached to an automobile body, Figure 2 represents a side elevation of a modification of the invention applied to a "turtle-back" automobile body, Figure 3 is a vertical section of the device of Figure 2 with the trunk body in closed position and the lid in a non-covering position relative to the top of the trunk body, Figure 4 is a side elevation of the device of Figure 2 with the trunk in its normally closed position, Figure 5 is a broken section taken along the line 5—5, Figure 4, and Figure 6 is a reduced side elevation of the trunk removed from the automobile body and employed as a camp table.

Referring more in detail to the drawing, the reference numeral 6 designates a body of an automobile, or other vehicle, and in Figure 1, a trunk 7 embodying my invention is illustrated as fastened by screws 8 or other suitable means, to a rack 9 mounted on the vehicle body.

A filler 10 is interposed between the body 6 and the trunk 7 and is pivotally connected with trunk 7 as indicated at 12. The filler comprises a flat back wall 13, and sides 14 having edges 15 shaped to fit snugly against the body 6. Recesses 16 are provided in sides 14 and fingers 17 on the rack extend into recesses 16 to clampingly secure the filler to the rack.

The fingers 17 and screws 8 cooperate in holding the connected trunk and filler assembly in rigid engagement with the rack during operation of the vehicle, while permitting ready removal if it is desired to use the trunk as a table in the manner hereinafter to be described.

The trunk, in both modifications illustrated, comprises a frame 18 in the form of walls 19, and a box-like member 20 is hinged to the frame 18 as indicated at 21. The box-like member comprises a bottom 22 carrying laterally extending ends 23 which fit against the walls 19 when the box-like member is in its normal position in the trunk and a flanged lid 24 pivotally mounted on the ends at 40 normally encloses the top of the trunk. Tie-bars 26 and 26a extend between the ends 23 opposite the bottom 22. The lid is hinged to the tie bar.

Suitable locks 27 and 27a may be provided for the trunk and in the drawing one lock 27 has been illustrated in the form of a pivoted hasp 28 on lid 24 which engages a hook 29 on bottom 22. The other lock is designated 27a and is the usual spring lock having its socket mounted on wall 19 and its tongue carried on flange 37. It is to be understood that any suitable mechanism may be employed and located wherever required to attain the desired results. Handles 30 are provided on walls when desired to facilitate moving the trunk.

Folding braces 31 pivotally fastened at 32 to walls 19 and at 33 to ends 23 limit the movement of box-like member 20 outwardly from the trunk, and maintain it in a substantially horizontal position, when the same is used as a table.

The lid 24 is movable to a substantially horizontal position of rest, in which position it may be utilized as a table top when desired.

In the modification illustrated in Figure 1, the lid 24 is raised from engagement with the ends and bottom to a horizontal position in which it forms an extension, where it is supported by folding braces 34. A plate 39 of any desired width is superposed on tie-bar 26 to form a continuation of the table top when the lid 24 and bottom are in horizontal position.

The lid 24 in the modification shown in Figure 1 has an end flange 35 and overhanging side flanges 36, which fit upon the exposed edges of walls 19 when the trunk is closed.

In the modification shown in Figures 2, 3, 4 and 5, the ends 23 are flanged at 37 and 38 to overlap the exposed edges of walls 19. The lid 24 also slightly overlaps the ends 23, so that it is supported on flanges 37 in closed position, (best shown in Figures 4 and 5) but is of lesser width than the distance between walls 19 to permit its being moved to the position shown in Figure 3. The lid is provided with an end flange 35, but has no side flanges, since it is not intended to engage walls 19.

Attention is directed particularly to Figure 3 from which it will be seen that there is no partition between the inside of the car body, represented by numeral 6, and the inside of the box-like member 20 and therefore, when the parts are in the position shown in Figure 2, access can be had to the interior of the car body up to the back of the rear seat. When the cover 24 is in the position shown in Figure 2, articles of considerable length can be transported as they may extend as far forward as the rear of the back seat, and project to the rear of the box-like member 20. With the dropside in the position shown in Figure 2, and the cover in the position, relative to the box-like member, shown in Figure 4, a storage space which includes all of that part of the body to the rear of the rear seat and all of the space of the box-like member is available for storage. The part 20 is hinged to the car body at 21 while the walls 19 are also attached to the body and therefore the construction shown in Figures 2 to 5 is in fact a part of the car body and in no sense an attachment thereto.

When it is desired to use the trunk as a table attached to the car body, the box-like member is lowered to a horizontal position, and lid is swung on its hinge 40 until it rests upon tie-bar 26 and ends 23.

It will be observed that in both modifications, the lid when used as a table top, is in substantial horizontal alinement with the uppermost edges of ends 23 when the box-like member is horizontally disposed. This arrangement places the table top at a sufficient distance above ground to afford maximum comfort and convenience to persons seated at the table.

If the trunk is to be employed in carrying material too bulky to be fitted within the same, the lid 24 is movable to an open position in either modification, which permits such material to be placed within the trunk with a portion of the same extending upwardly out of the top of the trunk. In the modification shown in Figure 1, the lid is left in the position shown, and the box-like member is moved to its normal position in the frame.

In the modification illustrated in the other views, the box-like member is moved from the position shown in Figure 2 to the position shown in Figure 3, the lid remaining as shown in both instances.

From the foregoing it will be readily understood that the present invention is adapted for installation in cars of the "turtle-back" body style, without modification of present construction and when so installed become virtually a part of such car bodies, and is likewise adapted for use on car bodies of the style illustrated in Figure 1.

The trunk in the modification illustrated in Figure 1 is adapted for use as a separate camp table when desired. By unfastening screws 8 and slidably moving the filler out of engagement with fingers 17, the trunk may be removed from rack 9 and used as a table in the manner illustrated in Figure 6.

The filler 10 is swung on its hinge until it bears against the bottom of trunk 7, whereupon its back wall 13 comes into lengthwise alinement with the side of trunk 7, and the lid 24 is raised to form an extension of the table top at the opposite end of the trunk. In this manner a table top of substantial proportions and having a substantially even exposed surface is provided.

The trunk may be placed on any suitable supporting structure, which has been illustrated in Figure 6 in the form of demountable legs 41. When it has served its purpose as a camp table, the trunk is again fastened on the rack in the manner hereinabove described.

Changes and modifications may be availed of within the spirit and scope of the invention as defined in the hereunto appended claims.

What I claim and desire to secure by Letters Patent is:

1. In a device as described, a body having spaced vertical walls open along their tops and rear edges, a box-like member having a bottom and end walls hinged to the body along a line connecting the lower rear corners of the vertical walls, a lid mounted for pivotal movement about an axis connecting the corners of the end walls, diagonally located with respect to the hinge, the lid being shorter than the distance between the vertical walls and longer than the distance between the end walls, the latter having flanges that project outwardly therefrom and overlap the vertical walls to close the space between the vertical and the end walls when the bottom is turned to vertical position.

2. A device in accordance with claim 1 in which the corners of the end walls, diagonally located with respect to the hinge are connected by a tie bar, and in which the lid is hinged to the tie bar for a pivotal movement of substantially 270 degrees.

3. A device in accordance with claim 1, in which the upper rear corners of the end walls are connected by means of a tie-bar to which the lid is hinged.

4. A device in accordance with claim 1 in which means is provided for supporting the box-like member with its bottom in substantially horizontal position.

5. A device in accordance with claim 1 in which the lid is mounted to turn through an angle of substantially 270°, about a pivot joining the upper rear corners of the end walls.

6. A device in accordance with claim 1 in which the vertical walls are integral portions of an automobile body.

7. An automobile body having a downwardly sloping rear end provided with a substantially rectangular opening, the upper edge of which is positioned forwardly of the lower edge, vertical wall members, extending upwardly and rearwardly from the body, along the ends of the opening, said wall members being connected with the body to form an integral part thereof, a box-like member having a bottom, end walls and one side wall, the fourth edge of the bottom being connected with the lower edge of the opening in the body by means of a hinge, the end walls of the bottom being positioned on the inside of the vertical walls of the body, each end wall having outwardly extending flanges along its bottom and rear end which project beyond the vertical walls to form a weather seal when the box-like member is in closed position, means for supporting the box-like member in open position, with the bottom substantially horizontal and means for holding the box-like member in closed position.

HENRY GOEDDERTZ.